US012607447B2

(12) United States Patent
Levesque

(10) Patent No.: US 12,607,447 B2
(45) Date of Patent: Apr. 21, 2026

(54) MONITORING WEAR ASSEMBLES, SYSTEMS, AND METHODS FOR MINING EQUIPMENT

(71) Applicant: Carriere Industrial Supply Limited, Lively (CA)

(72) Inventor: Pierre R. Levesque, Sudbury (CA)

(73) Assignee: CARRIERE INDUSTRIAL SUPPLY LIMITED, Toronto (CA)

( * ) Notice: Subject to any disclaimer, the term of this patent is extended or adjusted under 35 U.S.C. 154(b) by 281 days.

(21) Appl. No.: 18/231,117

(22) Filed: Aug. 7, 2023

(65) Prior Publication Data

US 2024/0044634 A1    Feb. 8, 2024

Related U.S. Application Data

(60) Provisional application No. 63/396,169, filed on Aug. 8, 2022.

(51) Int. Cl.
*G01B 7/06* (2006.01)
*B02C 17/18* (2006.01)
(Continued)

(52) U.S. Cl.
CPC .................. *G01B 7/06* (2013.01); *E02F 9/24* (2013.01); *E02F 9/26* (2013.01); *G01N 3/56* (2013.01);
(Continued)

(58) Field of Classification Search
CPC .. G01B 7/06; G01B 5/30; G01B 21/32; E02F 9/24; E02F 9/26; G01N 3/56;
(Continued)

(56) References Cited

U.S. PATENT DOCUMENTS 3,958,445 A    5/1976    Howard et al.
4,577,450 A    3/1986    Large
(Continued)

FOREIGN PATENT DOCUMENTS

AU    2014200336 A1    8/2014
DE    2227571 A1    12/1973
(Continued)

OTHER PUBLICATIONS

Velletri; Piero, "WearSense™ Reduces Operating Costs by Monitoring Chute Liner Wear in Real-time", Available at << https://www.metso.com/insights/blog/mining-and-metals/reducing-operating-costs-by-monitoring-chute-liner-wear-in-real-time/>>, Jul. 8, 2021, 10 pages.
(Continued)

*Primary Examiner* — Ryan D Walsh
(74) *Attorney, Agent, or Firm* — Palmer Dzurella

(57) ABSTRACT

A monitoring system for monitoring wear and usage along a portion of a wear surface for earth moving equipment includes a monitoring assembly to detect a characteristic pertaining to wear or usage in a wear part for excavating equipment and transmit the detected characteristic as information, wherein the monitoring assembly includes a bolt having a standard head, a coupling nut that captures the bolt on one end, a spacer secured to the top of the head, and a sensor probe having an elongate structure that passes through both the bolt and the coupling nut and is captured by the coupling nut on an opposite end. The monitoring assembly being wirelessly able to communicate to a remote device to monitor wear.

13 Claims, 8 Drawing Sheets

(51) Int. Cl.

| | |
|---|---|
| *E02F 9/24* | (2006.01) |
| *E02F 9/26* | (2006.01) |
| *F16D 66/02* | (2006.01) |
| *G01B 5/30* | (2006.01) |
| *G01B 21/32* | (2006.01) |
| *G01N 3/56* | (2006.01) |

(52) U.S. Cl.
CPC ...... *B02C 17/1805* (2013.01); *B02C 2210/01* (2013.01); *F16D 66/021* (2013.01); *F16D 66/027* (2013.01); *G01B 5/30* (2013.01); *G01B 21/32* (2013.01); *G01N 2291/2691* (2013.01)

(58) Field of Classification Search
CPC ........ G01N 2291/2691; B02C 17/1805; B02C 2210/01; F16D 66/021; F16D 66/027
See application file for complete search history.

(56) References Cited

U.S. PATENT DOCUMENTS

| | | | |
|---|---|---|---|
| 5,146,785 A | 9/1992 | Riley | |
| 5,637,794 A | 6/1997 | Hanisko | |
| 6,250,429 B1 | 6/2001 | Kramer | |
| 6,360,850 B1 | 3/2002 | Odisho et al. | |
| 6,366,201 B1 | 4/2002 | Hanisko | |
| 6,401,533 B1 | 6/2002 | Gier et al. | |
| 6,564,909 B1 | 5/2003 | Razzano | |
| 7,172,144 B1 | 2/2007 | Slater et al. | |
| 9,724,697 B2 * | 8/2017 | Steed ...................... B02C 17/22 | |
| 10,011,975 B2 | 7/2018 | Carpenter et al. | |
| 10,378,188 B2 | 8/2019 | Pratt | |
| 11,261,028 B2 | 3/2022 | Cheevers | |
| 2003/0006896 A1 | 1/2003 | Passwater | |
| 2007/0163325 A1 * | 7/2007 | Radzisewski ............ G01N 3/56 73/7 |
| 2011/0037983 A1 * | 2/2011 | Davies ................... G01M 11/08 356/445 |
| 2011/0085883 A1 | 4/2011 | Swinderman et al. | |
| 2012/0043980 A1 | 2/2012 | Davies | |
| 2015/0362306 A1 | 12/2015 | Steed et al. | |
| 2017/0167524 A1 | 6/2017 | Elston | |
| 2019/0151855 A1 | 5/2019 | Davies | |
| 2021/0069720 A1 * | 3/2021 | Steed ...................... H04W 4/80 |
| 2021/0132006 A1 * | 5/2021 | Vaidya ................... G01N 29/14 |
| 2022/0048037 A1 | 2/2022 | Zec | |
| 2022/0136917 A1 | 5/2022 | Schumacher et al. | |
| 2022/0412859 A1 * | 12/2022 | Bourgeois ............... F04D 7/045 |

FOREIGN PATENT DOCUMENTS

| | | |
|---|---|---|
| DE | 4312354 C1 | 6/1994 |
| DE | 19822168 C1 | 10/1999 |
| EP | 0616144 A1 | 9/1994 |
| EP | 0685297 A1 | 12/1995 |
| EP | 3327205 A1 | 5/2018 |
| FR | 2319880 A1 | 2/1977 |
| FR | 2599831 B1 | 8/1990 |
| IN | 202031028477 A | 8/2021 |
| JP | S6367505 A | 3/1988 |
| JP | H109310 A | 1/1998 |
| JP | 2939868 B2 | 8/1999 |
| JP | 2006202257 A | 8/2006 |
| JP | 2013088173 A | 5/2013 |
| JP | 2021105587 A | 7/2021 |
| WO | 2012122587 A1 | 9/2012 |
| WO | 2015024053 A1 | 2/2015 |
| WO | 2016131015 A2 | 8/2016 |
| WO | 2020061634 A1 | 4/2020 |
| WO | 2020198781 A1 | 10/2020 |
| WO | 2022106727 A1 | 5/2022 |

OTHER PUBLICATIONS

Wearmon, "Wear Liner Real-time Monitoring Sensors with Condition-based Predictive Maintenance Software", Available at <<https://s5system.com/wearmon/>>, 2023, 8 pages.

* cited by examiner

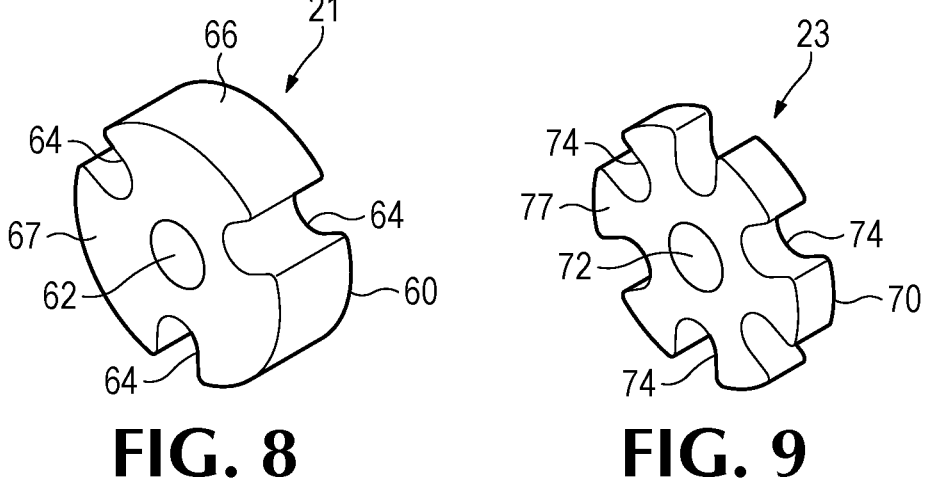
FIG. 8         FIG. 9
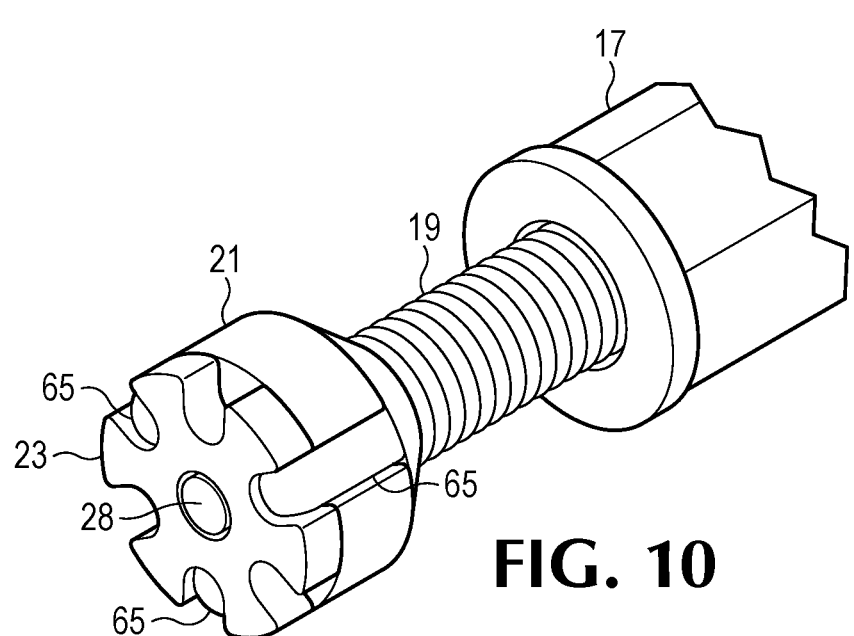
FIG. 10

MONITORING WEAR ASSEMBLES, SYSTEMS, AND METHODS FOR MINING EQUIPMENT

RELATED APPLICATIONS

This application is claims priority benefits to U.S. Provisional Patent Application No. 63/396,169, filed Aug. 8, 2022, entitled "MONITORING WEAR ASSEMBLES, SYSTEMS, AND METHODS FOR MINING EQUIPMENT". This application is incorporated by reference herein in its entirety and made a part hereof.

FIELD OF THE DISCLOSURE

The present disclosure relates to a system and method for monitoring wear and/or usage of wear surfaces for earth moving equipment (fixed or mobile), and/or the condition and/or part identification of sensors and/or wear parts. Particularly in bolted on wear surfaces for earth moving equipment that transport earthen material therethrough or earth working equipment that gather earthen material.

BACKGROUND

Wear parts are commonly attached to earth working and earth moving equipment to protect the equipment from wear. For example, wear plates, wear liners, runners, buttons, and wear tiles can be attached to the equipment. These kinds of wear parts are commonly subjected to harsh conditions and repeated loading. Accordingly, the wear parts wear out over a period of time and need to be replaced to avoid damage to the underlying equipment. If the wear parts are not replaced at the appropriate time, a wear part may wear beyond the expected life and/or break or become unexpectedly separated, which may expose other components of the excavating equipment leading to the other components or the underly equipment structure experiencing unwanted wear.

SUMMARY OF DISCLOSURE

Examples of the present disclosure provide a system, an assembly, and a method of use for monitoring wear and/or usage along a portion of a wear surface for earth moving equipment, and/or the condition and/or part identification of sensors and/or wear part.

In one example, a monitoring system for monitoring wear and usage along a portion of a wear surface for earth moving equipment includes: a monitoring assembly configured to detect a characteristic pertaining to wear or usage in a wear part for excavating equipment and transmit the detected characteristic as information, wherein the monitoring assembly includes a bolt having a head and a threaded body, a coupling nut that captures the bolt on one end, and a sensor probe having an elongate structure that passes through both the bolt and the coupling nut and is captured by the coupling nut on an opposite end; and at least one remote device for receiving the information. In some examples, the remote device is configured to generate an alert when the information received indicates that the wear part has worn to at least a predetermined level.

In another example, a monitoring system for monitoring wear and usage along a portion of a wear liner for a chute for moving earthen material includes: a monitoring assembly configured to detect a characteristic pertaining to wear or usage in a wear part for excavating equipment and transmit the detected characteristic as information, wherein the monitoring assembly includes a bolt having a head and a threaded body, a coupling nut that captures the bolt on one end, and a sensor probe having an elongate structure that passes through both the bolt and the coupling nut and is captured by the coupling nut on an opposite end; and at least one remote device for receiving the information. In some examples, the remote device is configured to generate an alert when the information received indicates that the wear part has worn to at least a predetermined level.

In a further example, a monitoring assembly for detecting wear or usage in a wear part for excavating equipment includes a bolt having a head and a threaded body, and a sensor probe having structure that exits through the head of the bolt to detect a characteristic of wear.

In a still further example, a monitoring assembly for detecting wear or usage in a wear part for excavating equipment includes a bolt having a head and a threaded body, a coupling nut that captures the threaded body of the bolt on one end, and a sensor probe that includes an elongate structure that passes through both the bolt and the coupling nut and is captured by the coupling nut on an opposite end.

In one example, the structure of the sensor probe may include a body for at least partially housing a sacrificial wear sensor. For example, the sacrificial probe configured to be at least partially destroyed in response to wear in the wear part, partial destruction of the probe being indicative of said wear being detected.

In another example, a monitoring assembly for detecting wear or usage in a wear part for excavating equipment includes a bolt having a head and a threaded body, a spacer secured to the top of the head, and a sensor probe having an elongate structure that passes through both the bolt and the spacer to an inner surface of the spacer that aligns with an inner surface of the wear part that is subjugated to earthen material.

In a further example, a monitoring assembly for detecting wear in a wear part for excavating equipment includes a bolt having a head and a threaded body, a spacer secured to the top of the head of the bolt and including a tool interface on one side, and a sensor probe having an elongate structure that passes through both the bolt and the spacer to an inner surface of the spacer.

In another example, a system for monitoring the wear and/or usage a bolt-on wear part includes a sensor incorporated into the fastener securing the wear part to the underlying base equipment.

In another example, a monitoring system includes a sensor to monitor wear and/or usage of a wear part secured to a earthmoving equipment and to provide part identification and/or location of the wear part on the equipment to assist inventory management and/or ordering of the wear parts as they wear.

In a still further example, a method of monitoring wear in a wear liner for a chute, the method including: removing a bolt from a fastening location on the wear liner, inserting a bolt having a head and a spacer secured to the head into a bolt hole, securing the bolt and spacer combination to the wear liner with a coupling nut, inserting an elongate structure of a sensor probe into the bolt and spacer combination and through the coupling nut, ensuring a tip of the structure is aligned with the wear liner surface that is subjugated to wear, and securing the sensor probe to the coupling nut.

BRIEF DESCRIPTION OF DRAWINGS

FIG. 8 is a perspective view of a wafer of the monitoring assembly of FIG. 2.

FIG. 9 is a perspective view of a top wafer of the monitoring assembly of FIG. 2.

FIG. 10 is a perspective view of the monitoring assembly of FIG. 2 with the wafer and top wafer having been welded together and portions of the monitoring assembly broken away.

DETAILED DESCRIPTION

Relative terms such as front, rear, top, bottom and the like are used for convenience of discussion. The terms front or forward are generally used to indicate the usual direction of travel of the ground engaging product relative to the earthen material during use (e.g., while moving material), and upper or top are generally used as a reference to the surface over which the material generally passes when, for example, it passes through a chute. Nevertheless, it is recognized that in the operation of various equipment the wear parts may be oriented in various ways and move in all kinds of directions during use.

The excavation, transport, and processing of minerals in earthen material is performed by equipment having components such as: buckets, ground engaging tools, truck trays, chutes, hoppers, mills, crushers, picks, dredging teeth, etc. These components are subject to wear by the earthen material. Consequently, many of these components have wear parts with a higher wear resistant material to sacrificially protect the underlying equipment from the earthen material. In the context of this disclosure, wear encompasses, for example, erosion, and abrasion (low stress and high stress). If these wear parts are not replaced before they wear down to the underlying components or equipment, then said components and/or equipment become damaged from not having a protective layer. So protecting the underlying component or equipment is an important aspect of mining. This protection layer can be closely gauged by wear monitoring and provide more accurate maintenance planning.

A wear part may be difficult or impossible to access without shutting down the equipment which leads to loss of productivity of the equipment. In cases where wear monitoring does not occur, wear parts may be on a predetermined schedule for replacement. Early replacement of a wear body results in unnecessary down time and cost, but late replacement may risk damage to the component or equipment being protected by the wear part. So there is risk involved in a replacement schedule that wear monitoring alleviates.

Figure 1:
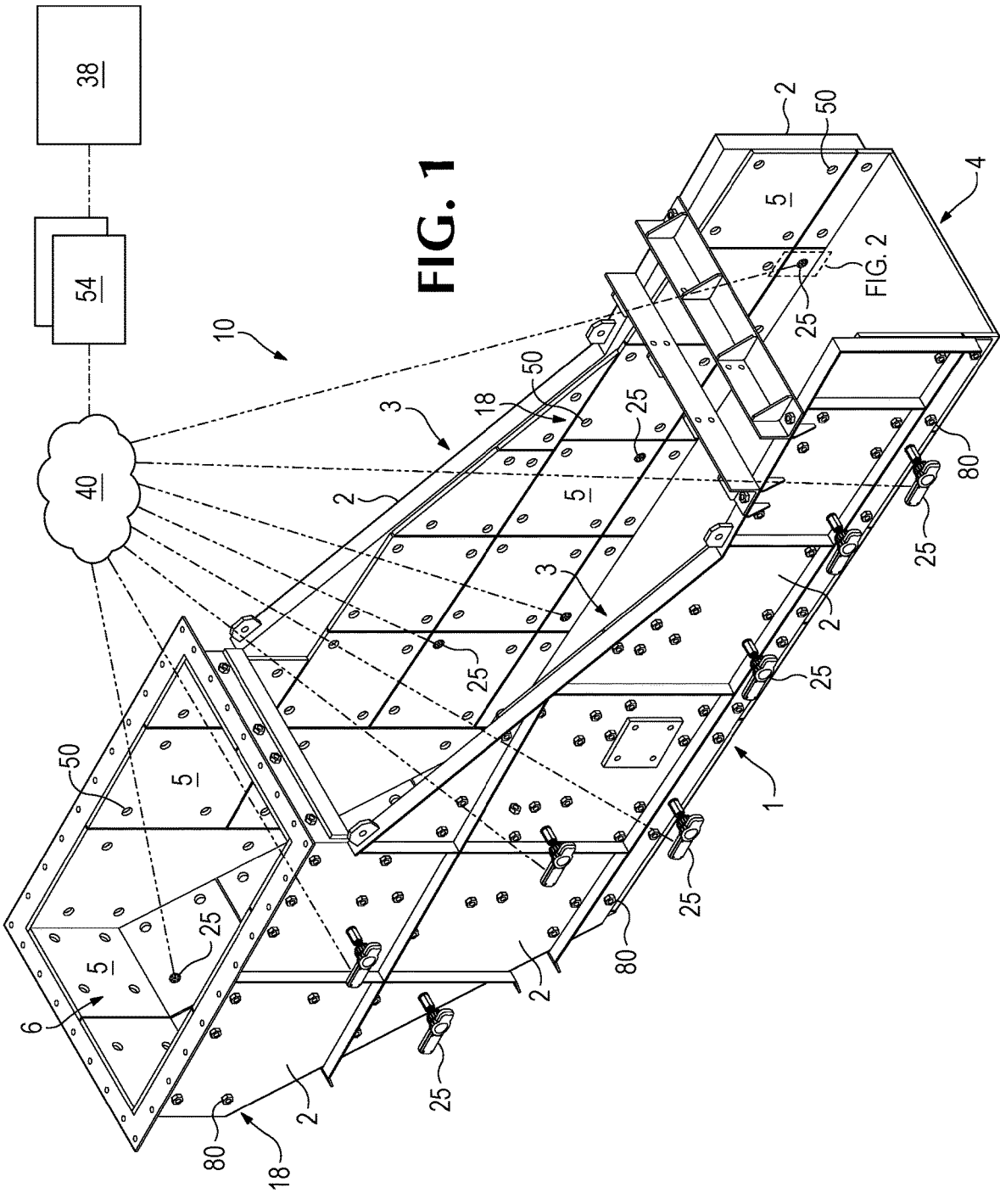
FIG. 1 is a perspective view of a wear monitoring system for a chute assembly.

FIG. 1 illustrates a wear monitoring system 10 including a plurality of monitoring assemblies 25, a communication network 40, a remote device 38, and equipment 1 being monitored. In the illustrated example, each of the monitoring assemblies 25 are within one of the plurality of wear plates, liners, or tiles 5 secured on a base or a support structure 2 of the earth working equipment (e.g., a chute assembly 1) for protecting the base 2 while moving earthen material. One or more monitoring assembly 25 may be installed in a single wear part 5. For example, wear parts may have uneven wear that can be monitored by multiple monitoring assemblies. Additionally, each wear liner 5 protecting the equipment preferably includes at least one monitoring assembly 25 as one or more wear liner 5 of the group of wear liners protecting the equipment may need replacement while the others may not. Nevertheless, arrangements are possible where just selected wear parts of a group of wear parts include monitoring assembly. In the illustrated example, the monitoring assembly 25 is situated in the center of the wear part 5, but other locations are possible. The base 2 may be further secured to earth moving equipment 1. Other uses are possible, e.g. a wear runner on a bucket attached to an earth working equipment, a wear surface on a truck tray, and the like.

Figure 2:
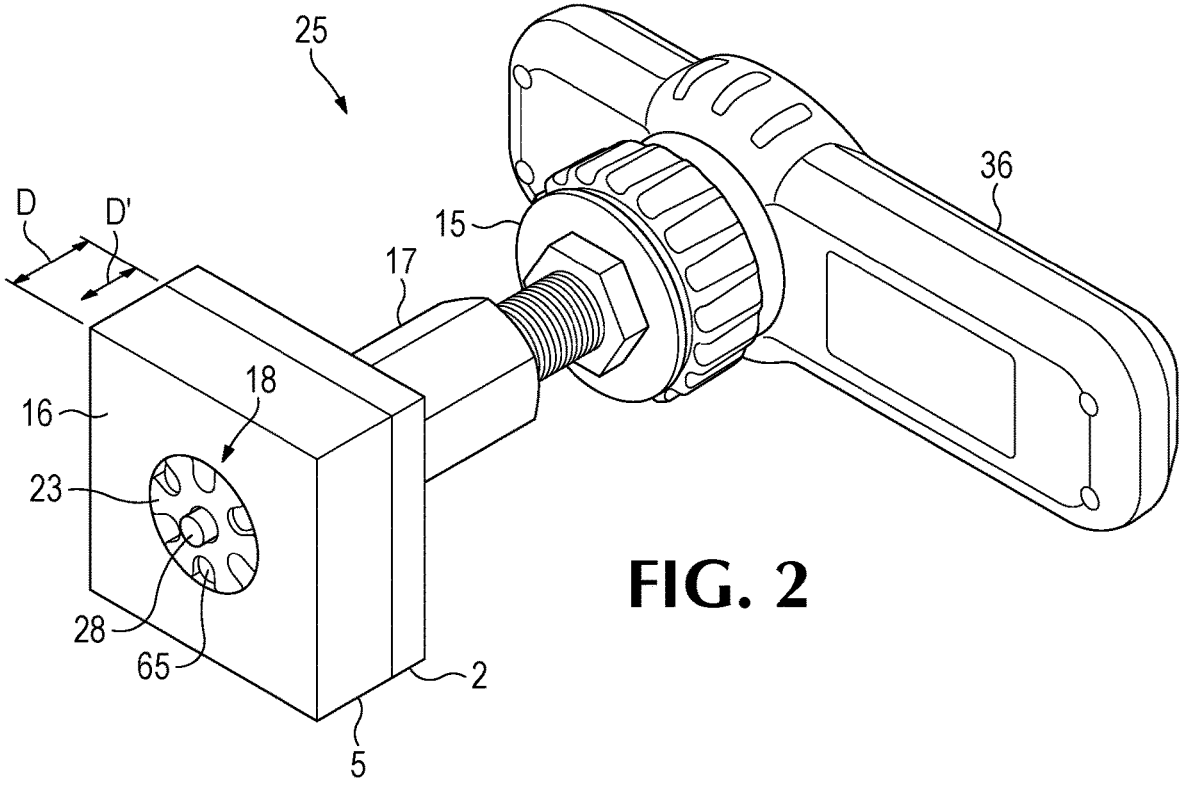
FIG. 2 is a perspective view of a monitoring assembly in a wear plate of the chute assembly of FIG. 1.

In the illustrated example of an earth moving equipment that requires wear parts, a chute assembly 1 is used to transport material from one process step to another in mining operations. When material is fed into a process or discharged from it, chutes collect, convey and prepare the material flow for the following processing phase. The illustrated chute assembly 1 includes walls 3, 4, but other configurations are possible (e.g. four walls). In the illustrated example, the chute assembly 1 includes two side walls 3, a bottom wall 4, and an entry opening 6 to introduce material. In some examples, chutes may be constructed into a chute assembly 1, wherein at least one wall is constructed of a plurality of wear surfaces 5, e.g. wear liners that may be attached onto the underlying equipment or base, e.g. a skin 2 of the equipment. Each of these wear liners is a replaceable member of the chute assembly 1. The illustrated wear tile 5 is square or polygonal shaped, but other shapes are possible (e.g. circular, semi-circular, rounded rectangular, rectangular, and the like). In this and other examples, the wear part 5 may include at least an outer layer that is made from, for example, any one of metallic white iron, hard alloy steel, chromium carbide, ceramic, polyurethane, polymer, rubber, other wear material or some combination thereof. An exposed face 16 of the wear part 5 in use experiences wear from earthen material that travels along the chute assembly 1 (FIG. 2). In many cases the wear liners 5 are fastened onto the skin 2 of the equipment 1 by bolts 50 at specific locations 18. In one example of the disclosure, an advantage may be that the monitoring assembly 25 may be easily installed into a manufactured fastening location 18. This means a new location would not be necessary to create and install the monitoring assembly 25 therein, which eliminates further requirements which can result in downtime and potential mishaps that occur during the preparation of the wear part for a different wear assembly.

Figure 3:
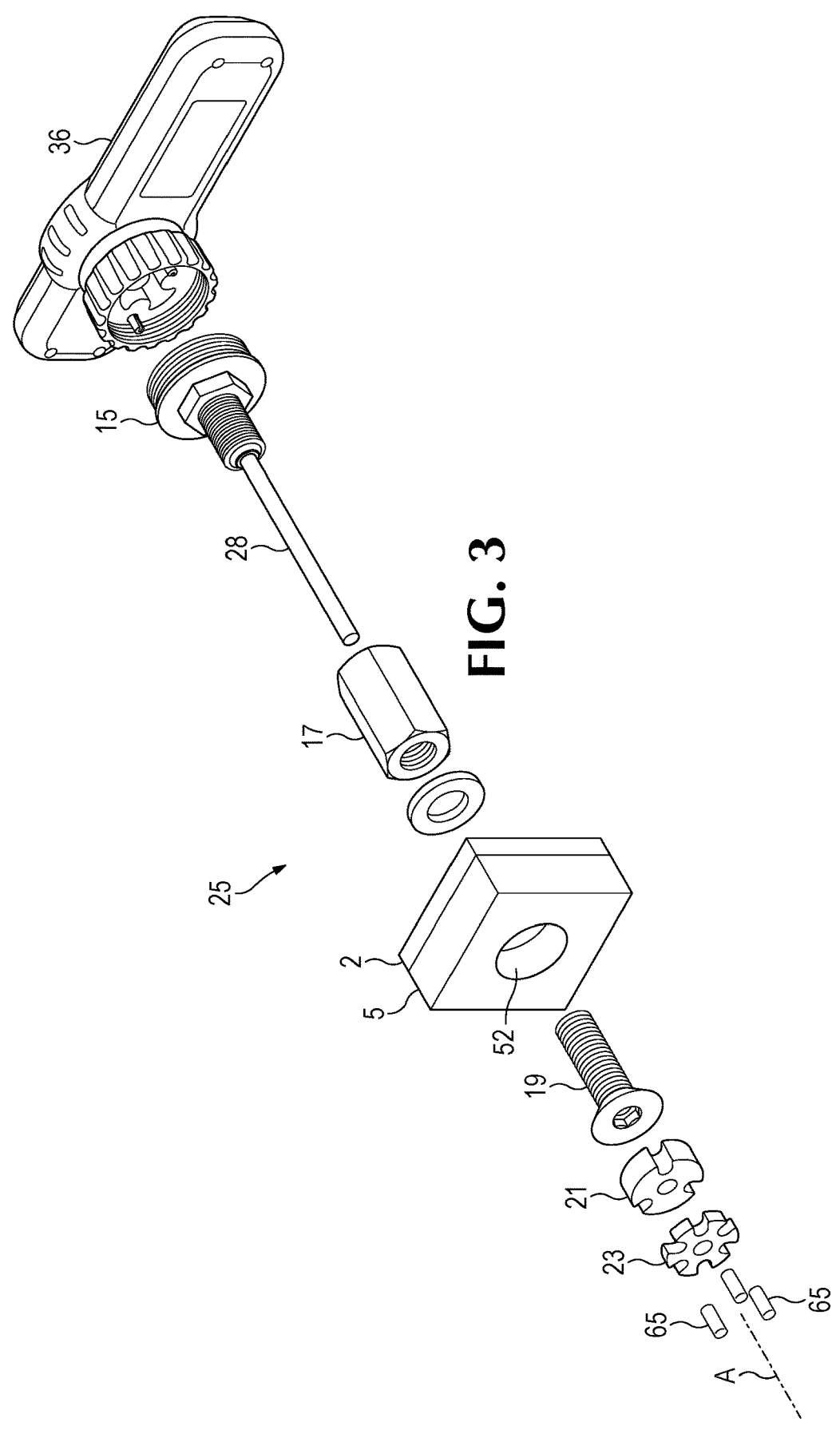
FIG. 3 is an exploded view of the monitoring assembly of FIG. 2.
Figure 4:
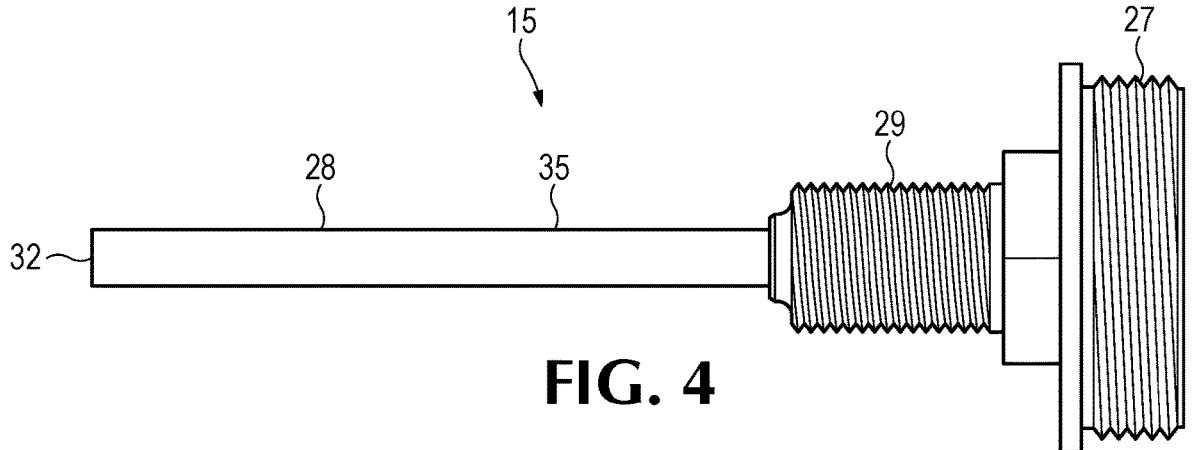
FIG. 4 is a side view of the sensor probe of the monitoring assembly of FIG. 2.

Referring to FIGS. 2-4, the monitoring assembly 25 may generally include: a sensor probe 15, a coupling nut 17, a bolt 19, a wafer or spacer 21, and a top wafer 23. In some examples, a washer may be used between the coupling nut 17 and the base 2. The sensor probe includes a head 27 on end, a threaded body 29 on the opposite end, a structure 28 extending outward from the threaded body 29 to a tip 32, at least one or more electronic devices or sensors at least partially housed in the structure 28 (not shown) for identifying characteristics such as wear and usage in wear surfaces 5 for earth moving equipment, and condition and part identification of sensors and the wear part 5 the sensors 35 are installed in, a communication device 36 Communication device 36 may be attached to sensor 35 via electronic cable and treaded onto head 27 of probe (e.g., a transmitter and/or receiver) for communicating information to and/or from the monitoring device to or from a remote device 38 (FIG. 1), storage, and a battery (FIG. 4). The various components can be different components working together or they may be combined (e.g., with the sensor 35, various components and transmission device 36 being the same component, e.g. on the same circuit board, generally referred to as 36). The various components may be housed within either the head 27 or threaded body 29.

In the illustrated example, the sensor 35 is illustrated as an electronic sacrificial probe configured to be at least partially destroyed in response to wear in the surface 16 of the wear part 5. The partial destruction of a stem of the sensor probe 15 being indicative of wear being detected. The sensor 35 may be housed in a structure 28 made of a polymeric material, e.g. a semicrystalline aliphatic polyamide, but other materials are possible. In some examples, a filler material such as a settable adhesive, a resin, an epoxy, a potting agent, or the like is disposed in a receptacle that houses the various components within the structure 28, e.g. tube. The filler material may also be a dielectric material.

Referring to FIG. 4, the head 27 of the sensor probe 15 is enlarged and sized and shaped to be larger than the body 29, but other configurations are possible. The structure 28 comprises an elongated body 29 that houses a circuit board (not shown) therein. A plurality of sequentially arranged discrete electronic components is disposed within the elongate structure 28 and mounted to the circuit board. The structure 28 is hollow and houses at least a portion of the sensor that monitors an electrical characteristic that can be monitored by a processor (either on board or a remote device 38) to determine a depth of the structure 28, and therein the depth D of the wear part remaining and transmit the depth and/or electrical resistance via the communication device 36.

Figure 12:
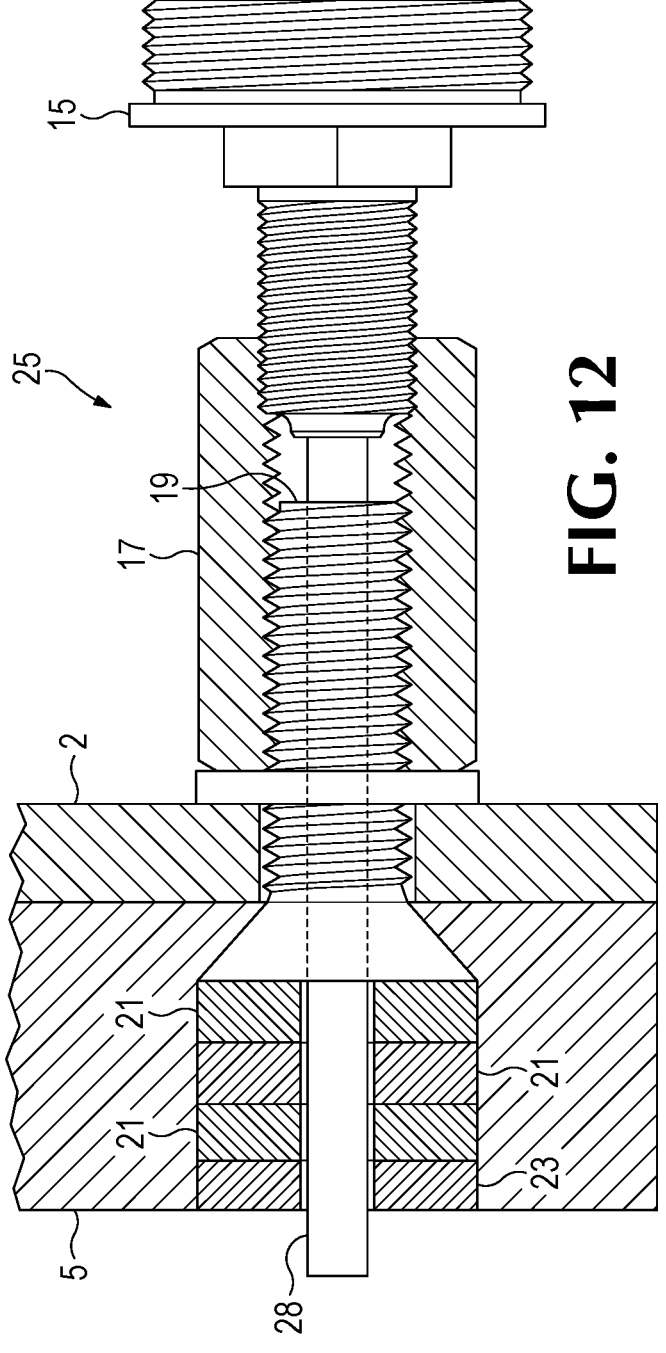
FIG. 12 is a magnified view of a portion of a wear surface with another monitoring assembly with varying wafers to match wear surface for site installation of FIG. 2 with portions in cross section.

The electrical characteristic of the structure changes as the sensor 35 is worn down. In use, the structure 28, wafer 21, top wafer 23, and the sensor 35 therein wears as the wear part 5 wears. The depth of the structure 28 depends on the thickness of the wear part 5 to be monitored (FIG. 12). In one example, the electrical characteristic is resistance, so the electronic components are resistors. The employment of the resistors enables the monitoring assembly 25 to obtain information indicative of the wear of the part based on the resistance of the ladder of resisters. For example, it may compare the voltage across a plurality of resistors against a look-up table stored in the memory and from that generate information indicative of the depth of the structure 28, e.g. comparing the starting depth with the amount that has been worn away. In another example, the electrical characteristic is current and/or voltage. In this case, conductive wire is situated from a printer circuit board (PCB) to different locations on the probe. As the probe wears the circuits created by the conductive wires would become open loops. A processor could check the status of the circuit for each wire and determine the amount of wear based upon which circuits have become open. The depth corresponding to the depth or degree of wear of the wear plate 5. In other examples, electrical characteristics, such as inductance and capacitance, with inductors and capacitors may be used, a logical electronic known property, or other known number of electronic components in the structure 18, may be similarly exploited. The structure 28 is arranged so that the electrical characteristic can be monitored by a processor housed in the circuit board containing the communication device 36 or a remote device 38, which uses programmable logic to determine a measurement of the wear or life remaining on the wear part 5 based on that electrical characteristic of the structure 28. The sensor probe 15 may also be physically measured to determine the wear, and then put back in place.

Monitoring assembly 25 also could have other constructions. For example, monitoring assembly 25 can include multiple sensors for redundancy or sensing other characteristics (e.g., high impact events, digging cycles, etc.), a receiver for receiving information from a remote device 38, storage mediums for holding data (e.g., the part ID associated with a particular wear part, resistance to depth charts, etc.), an accelerometer, a GPS device, and/or a microprocessor for processing data or other information. A monitoring assembly 25 may also be a passive system without a transmitter or a battery.

Referring back to FIG. 1, the monitoring assembly 25 may communicate via network 40 with a remote device 38, which simply means a device remote from the monitoring assembly 25. Examples of communication network 40 include intranets, internets, the Internet, local area networks, wide area networks (WAN), mining site network, wireless networks (e.g. WAP), secured custom connection, wired networks, virtual networks, software defined networks, data center buses and backplanes, or any other type of network, combination of network, or variation thereof. Communication network 40 is representative of any network or collection of networks (physical, cloud based, or virtual) and may include various elements, such as switches, routers, fiber, wiring, wireless, and cabling to connect the various elements of the system 10. Communication between system 10 components and other computing systems, may occur over a communication network 40 or networks and in accordance with various communication protocols, combinations of protocols, or variations thereof. The aforementioned communication networks and protocols are well known and need not be discussed at depth here. It should be appreciated that the network 40 is merely exemplary of a number of possible configurations according to examples of the present technology. In other examples, the various components of system 10 may be co-located or may be distributed geographically.

The monitoring assembly 25 sends, e.g., a continual, intermittent, batch, or event driven signal 54 concerning, e.g., the monitored characteristic of the wear part 5. In the illustrated example, the signal is received by a remote device 38, which in this example includes an antenna of the remote device 38. An antenna can be provided in other positions and mounted on different supports in lieu of or in addition to the antenna on the remote device 38 (e.g. some intermediate position). The remote device 38 could be a LoRa server that communicates with the internet through a LoRa network. The information sent to the remote device 38 may be provided to and/or combined with data from a handheld device, cloud database, other data sources, etc. to provide helpful information and analysis. Multiple antennas and/or remote devices 38 could be used to increase the reliability of picking up the signal or signals from a plurality of monitoring assemblies 25 if desired or needed for the particular operation. Nevertheless, other variations are possible that have more obstructions, limited time periods where signals can be received, etc. In cases where signals can only be received at certain times, monitoring assembly 25 and/or remote device 38 may transmit only during certain times (e.g., when the chute is empty of material, when a trigger signal is received, etc.) or may continue to transmit continually.

The remote device 38 can be secured to a different portion of the equipment 1 being monitored. The remote device 38 could be indirectly connected to the monitored wear part. The remote device 38 could also be separately supported such as on a service truck, drone, handheld device, a display in a cabin. A single remote device 38 may be used or a collection of remote devices 38 working together or separately may be used. As examples, a remote device may include a processer (PC, microprocessor, etc.), a database, a transmitter, a receiver, etc. The remote device 38 may communicate with additional monitoring assemblies 25 on the wear part, other wear parts, equipment 1 and/or with a database or computer. The remote device 38, for example, may be a wireless device or a wired device.

The monitoring assembly 25 and the remote device 38 can be designed to communicate with each other in different ways and no one particular way is needed. For example, the monitoring assembly 25 could be designed to only transmit information and the remote device 38 designed to only receive information from the monitoring assembly 25. In other examples, the monitoring assembly 25 and the remote device 38 could be designed to communicate back and forth with each other. The communication may use various communication protocols, for example, without limitation, continuous, event driven, on demand, batch communication. Irrespective of the manner or timing of the communication, the information can be received and processed historically or as a real-time assessment. For example, if the signal is only available when earthen material is not moving across the wear plate 5, then the remote device 38 can still receive batch information of all the characteristics detected when the signal could not be accessed.

The remote device 38 and the monitoring assembly 25 may on their own, collectively, and/or with other devices, and/or software applications, and the like (e.g., data from a database in, for example, a cloud database, other processors, etc.) store, process and/or communicate information related to characteristics such as wear and usage or wear profile of the wear part 5 on the equipment 1, and condition and part identification of sensors. Information related to the part ID of wear part can include such things as wear part type, product number, customer number, brand name, trademark, manufacturer, bill of materials, dimensions of product, and the wear part installed on what specific wear part for inventory and easy replacement ordering, location of the wear part on the equipment, etc. Information related to usage of the wear part can include such things as the kind of machine using the wear part, time the wear part went into service, how much time the wear part has experienced events that potentially wear down the wear part, average time of the earthen material passing through the equipment 1, impact events, and the like. The part ID may be used as search criteria in order to retrieve additional information regarding the specific wear part. The search criteria may be used to query one or more relational databases and/or broader data structures, such as an inventory replacement database that could be utilized to order a replacement for just in time delivery. Information related to usage of the wear part may also include such things as earthen material (e.g. tons) moved across wear part and/or equipment (aggregate sum of all sensors), strain in the wear part, and the like.

Information related to wear can include such things as the wear profile, estimate of wear part life remaining, per each increment of wear, and the like. These monitored characteristics are given as examples only and are not intended to be limiting. Information may be shared with, i.e. sent to and received from, various other equipment including processors, other networks, databases, and used with various software applications, and routines.

The remote device 38 may have a user interface. In this example, the interface has a display to presents wear information, which may be, for example, any one of resistance, the depth of wear, the thickness of the wear part remaining, whether the wear part needs replacement, estimate of remaining life, etc. The processor may be programed to produce a precautionary alert that a specific product is close to needing replacement. The alert may be, for example, a visual alert, haptic feedback, and/or an audio alert. The monitoring assembly 25 and/or remote device 38 may wirelessly (or by wire) provide the alerts to equipment operators and/or wireless (or wired) devises for access by the operator or others such as maintenance personnel, mine site managers or the like. In addition, the programmable logic may be programed to produce an alert if the condition indicates, e.g., that the sensor 35 is broken, or is at or near a predetermined depth D'. D' may be the equivalent to a top surface of the bolt 19 or may be lower as defined by an increment in the elongate probe (e.g. its last measurable position). The systems and methods obviate the need for continuous inspections of the wear part in a mine site which reduces human exposure (e.g. injury) and associated costs by continuously or periodically monitoring the thickness of a wear part. Providing alerts of the wear profile of the wear part, an operator is able to schedule and plan maintenance in a more time- and/or cost-improving manner than the current practice of continuous inspections or scheduled downtime.

Figure 5:
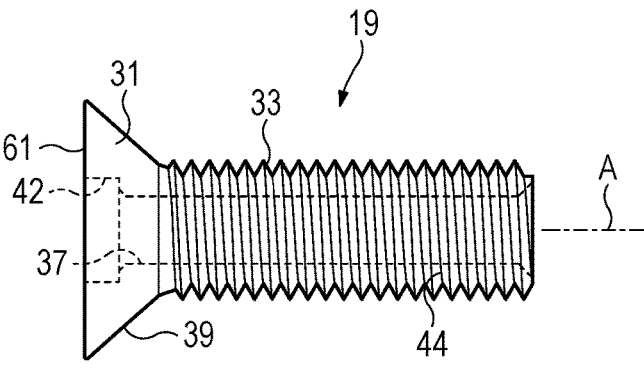
FIG. 5 is a side view of a bolt of the monitoring assembly of FIG. 2.
Figure 11:
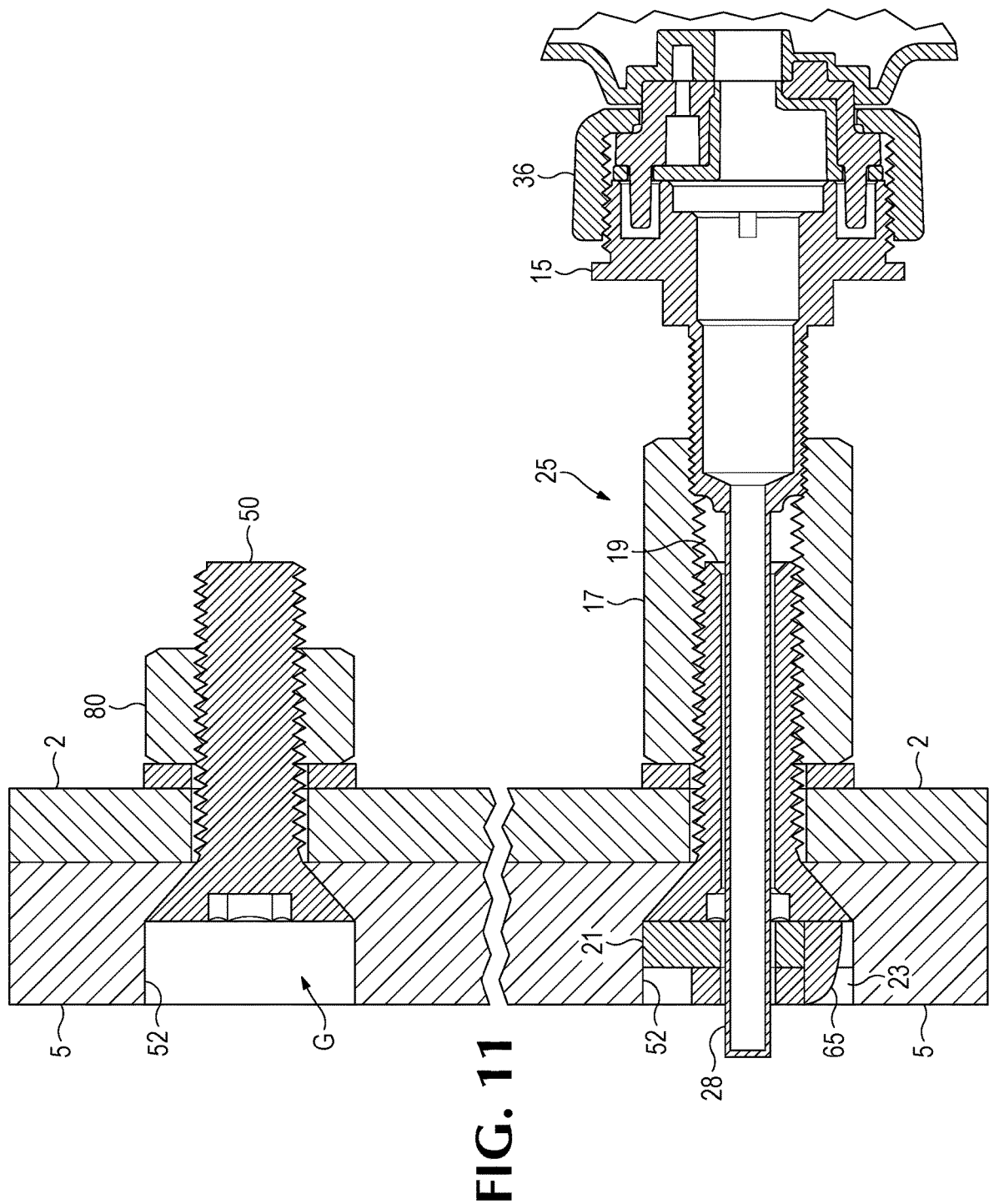
FIG. 11 is a cross section view of a portion of a wear surface with the monitoring assembly of FIG. 2 and a standard bolt installation.

Referring to FIG. 5, a bolt 19, which is illustrated to be similarly shaped as a bolt 50, is shown (FIG. 11). The illustrated bolt 19 is a socket cap configuration that includes a head 31, a body 33, and pass through aperture 37 that passes through the head 31 and body 33 of the bolt 19 along a longitudinal axis A. The head 31 is illustrated as being planar and may be larger than the body 33 with a ramped surface 39 that acts as a bearing surface when applied between the head 31 and the body 33. The body 33 having a threaded portion 44, but other configurations are possible. For example, the head may be a hex tool surface or other standard head. In other examples, the head 31 is a counter sunk cap screw. The through-hole 37 may have at one end a tool receiving structure 42. The through-hole 37 may be sized and shaped to fit the elongate structure 28 therethrough and out of the head 31 (FIG. 11). The bolt 19 may be similarly shaped to a bolt 50 so that it may fit similarly within a pre-existing bolt hole 52 (FIG. 11). The bolt 19 is similarly shaped to a bolt that fastens the wear liner, so the bolt 19 fits into a pre-existing bolt hole without further installation modifications (e.g. creating a new hole or expanding the current hole). This makes the monitoring assembly 25 easier, faster, and more economical to install.

Figure 6:
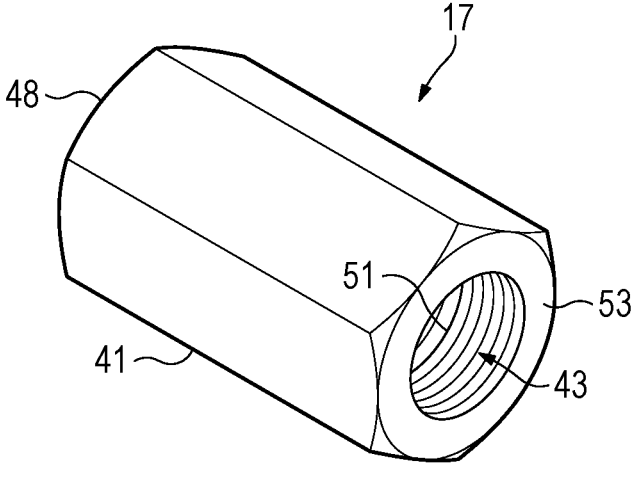
FIG. 6 is a perspective view of the coupling unit of the monitoring assembly of FIG. 2.
Figure 7:
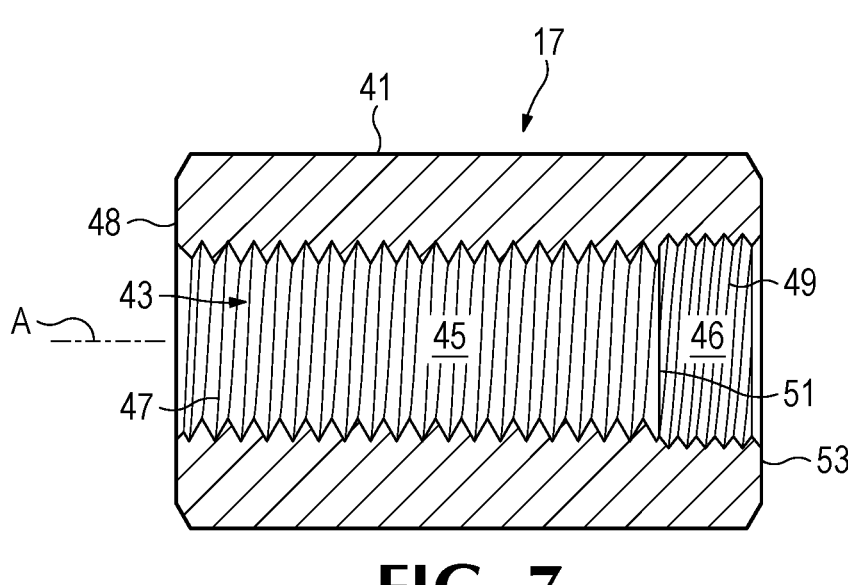
FIG. 7 is a cross section view of the coupling unit of FIG. 7 taken along line 8-8.

Referring to FIGS. 6-7, a coupler nut 17 is shown. The coupler nut 17 includes an outer body 41 and a pass through aperture 43 about a longitudinal axis A. The outer body 41 is illustrated as having a hex or six sided surface, but other configurations are possible. A tool (not shown) such as, e.g., a wrench can apply torque to the body 41 by turning or rotating the body 41 relative to longitudinal axis A about the bolt 19 for installing a portion of the monitoring assembly 25. The pass through aperture 43 includes a first portion 45 and a second portion 46, with the second portion 46 being illustrated as larger than the first portion 45, but other configurations are possible. The first portion 45 may include threads 47 that interface with the threaded portion 44 of the bolt 19. The second portion 46 may include threads 49 that interface with the threaded body 29 of the sensor probe 15. The second portion 46 may include a stop 51 in the threads, such that the sensor probe 15 is stopped consistently such that a known starting location for the depth for the threaded body 29 can be used for each sensor probe. The threads 47 and 49 may be a different thread machining. The first and second portions 45, 46 may have different lengths. In the illustrated example, the second portion 46 is shorter than the first portion 45, but other configurations are possible (e.g. they may be the same length). The coupler nut 17 acts to capture the bolt 19 within a bolt hole 52 on one end 48 using thread 48 and to capture the sensor probe 15 on the other end 53 using thread 49.

Referring to FIG. 8, a wafer 21 is shown. The wafer 21 includes a cylindrical body 60 with a pass through aperture 62 and at least one slot 64. In the illustrated example, there are three slots 64. The slots 64 extend inward from an outer surface 66 of the body 60. The pass through aperture 62 is sized and shaped to fit the structure 28 therethrough. The wafer 21 is secured to a top surface 61 of the head 31 of the bolt 19. In the illustrated example of FIG. 10, this accomplished by weld 65 in slots 64. Alternatively, wafer 21 can be otherwise secured to bolt 19 such as by brazing, adhesive, fasteners, or the like. The securement of the wafer 21 to the bolt 19 could be done at manufacturing or in the field during installation. A top wafer 23 is in the illustrated embodiment attached to a top surface 67 of the wafer 21.

Referring to FIG. 9, a top wafer 23 is shown. The top wafer 23 is similarly shaped to wafer 21 with the exception that there are more slots 74. The top wafer 23 includes a cylindrical body 70 with a pass through aperture 72 and at least one more slot 74 than wafer 21, but other configurations are possible. In the illustrated example, there are six slots 74, but other configurations are possible. Three slots 74 are used to weld the top wafer 23 to at least one wafer 21 and indirectly to the bolt 19. As with lower or outer wafer 21, the top or inner wafer 23 could be secured in other ways such as by brazing, adhesive, fasteners or the like. The other three slots may be used as a tool interface by a tool (not shown) to stop the bolt 19 from spinning during installation. The pass through aperture 72 is sized and shaped to fit the structure 28 therethrough. The wafer 21 is secured to a top surface 67 of the wafer 21. In the illustrated example of FIG. 10, the securement of the wafers 21, 23 is accomplished by weld 65 in slots 74, which are aligned with slots 64. The securement of the top wafer 23 to the wafer 21 could be done at manufacturing or in the field during installation. The pass through apertures 62, 72, 37 are aligned about the longitudinal axis A once all are assembled together. A top wafer 23 is usually a shorter depth than wafer 21, but other configurations are possible. The top wafer 23 and wafer 21 are made from similar material, if not the same. The preferred material is a wear material such as QT450 abrasion resistant hardened steel, but other materials may be used. The harder material is preferred because the wafers 21, 23 are being introduced to the earthen material at the same time as the wear part adjacent to it, so it is ideal that the wafers 21, 23 wear at a similar rate as the wear part 5 (FIG. 11). The structure 28 is typically softer than the wear part 5 and without the protective material of the wafers 21, 23, it may wear faster than the wear part 5 or break. The wafers 21, 23 surround the structure 28 to provide necessary support from material impact and abrasion to the structure 28 and protect the sensor 35 therein from breaking or wearing too quickly than the wear material.

Nevertheless, the wafers could have different structures (e.g., no slots). The wafers are also optional. Other arrangements are possible to stop rotation of the socket cap during installation. For example, the top or inner end of the socket cap may be formed with a tool-receiving structure to stop spinning during installation. Other arrangements are also possible to wear similarly to the wear plate being monitored. Using a wafer or other arrangement to wear similarly to the wear plate is preferred but not required. As an example, the wafers could be omitted such that the top or inner end of the socket cap could be elongated and directly exposed and worn away with the wearing of the wear part.

During installation of the monitoring assembly 25 shown in FIGS. 2, 11-12, the bolt 50 and nut 80 are removed from a bolt hole 52 at a fastening location 18 on a wear part 5. This is advantageous as no new passageways need to be created to install the monitoring assembly 25. The bolt 19 with the wafers 21, 23 secured to the top are inserted into the bolt hole 52 from the inside surface 16 of the wear part 5. The head 31 of the bolt 19 is enlarged, such that it abuts against an inner surface of the bolt aperture 52. In other examples, the wafers 21, 23 could be secured to the bolt 19 during installation, e.g. welding into aligned slots 64, 74. In the example shown in FIG. 12, there are more than one wafer 21 attached to the bolt 19. The amount of wafers, 21, 23 is determined by the thickness of the wear part 5. A top surface 77 of the top wafer 23 preferably aligns with the wear surface 16 of the wear part 5. This is to align the wear of the monitoring assembly 25 (and sensor 35) with the wear of the wear part 5, e.g. wear liner. Nevertheless, other arrangements where the sensor was initially recessed below the wear surface of wear part 5 or initially extending above could be used.

A tool may be used to interface with the unused slots in the top wafer 23 to restrict movement of the bolt 19, wafer 21, and top wafer 23 combination, so that the coupling nut 17 may be secured to the body 33 of the bolt 19. In another example, a tool may not be necessary if the head 31 included some anti-rotational feature that engaged with a complimentary feature in the bolt hole 52 to aid in rotation of the coupling nut 17. In the illustrated example, the bolt 19 is thread into the first portion 45 of the passthrough aperture 43, but may be secured through other means than threads.

The elongate structure 28 is inserted the end 53 of the coupling nut 17 until the threads 29 of the sensor probe 15 engage with the threads 49 of the second portion of the passthrough aperture 43. The threads 29 are rotated until they engage a stop 51 in the threads 49 of the second portion. Advantageously, the threads 29 of the sensor probe 15 allow for precise depth location of the structure 28 in the wear part 5. At this point the elongate structure 28 may extend inward through the head 31 of the bolt 19 and in some examples above the top surface 77 of the top wafer (FIG. 12). The structure 28 is disposed generally perpendicular to the wear surface 16 of the wear plate 5, but it need not be. In such cases, the elongate structure 28 should be cut flush, such that the end of the elongate structure aligns with the top surface 77 of the top wafer 23 to align with the inside surface 16 of the wear part 5.

In another example, where wafers 21, 23 are not used, an epoxy to fill the gap G around the elongate structure 28. In some examples, a settable adhesive, resin, sealant, potting agent or the like may be forced to fasten the structure 28 in place and close any gap between the wafers 21, 23, bolt 19, and coupling nut 17. In a further example, a single plug may be used in lieu of wafers 21, 23. In this case, the plug may include spanner like projections or grooves that mate with complementary like structure on the head 31 of the bolt 50. In other examples, the plug or bolt 19 may have a peel off adhesive attached thereto to secure to one another. The sensor probe 15 components extend beyond an outer surface of the base 2, which may aid in communications as the transmitter is not blocked or surrounded by metal material.

If desired, the monitoring assembly 25 can be removed and replaced when a new wear part 5 is installed. The sensor probe 15 assembly would need to be replaced, but the other components of the monitoring assembly 25 may be re-used with the new wear part.

The invention claimed is:

1. A monitoring assembly to detect a characteristic pertaining to wear or usage in a wear part for excavating equipment and transmit the detected characteristic as information, wherein the monitoring assembly includes a bolt having a head and a threaded body, a coupling nut that captures the bolt on one end of the coupling nut, a spacer secured to the top of the head, and a sensor probe having a threaded body and an elongate structure that passes through both the bolt and the coupling nut and the sensor probe is captured by the coupling nut on an opposite end of the coupling nut.

2. The monitoring assembly of claim 1, wherein the wear part is a wear liner for a chute.

3. The monitoring assembly of claim 1, wherein the threaded body of the sensor probe houses the elongate structure.

4. The monitoring assembly of claim 3, wherein the elongate structure is a sacrificial wear sensor, the wear sensor having a series of conductive wires located on different sections of the sacrificial wear sensor, such that the wear sensor monitors whether each circuit created by the series of conductive wires is open and/or closed.

5. The monitoring assembly of claim 1, wherein the spacer includes a tool interface on a side surface of the spacer.

6. The monitoring assembly of claim 1, further comprising a communication device, the communication device being able to send a wireless signal with sensor information to a remote device.

7. The monitoring assembly of claim 6, wherein the remote device is configured to generate an alert when the sensor information received indicates that the wear part has worn to at least a predetermined level.

8. The monitoring assembly of claim 1, wherein the wear part is a wear liner for a chute.

9. The monitoring assembly of claim 1, wherein the elongate structure of the sensor probe may include a body for at least partially housing a sacrificial wear sensor.

10. The monitoring assembly of claim 9, wherein the elongate structure is a sacrificial wear sensor, the sacrificial wear sensor having a series of conductive wires located on different sections of the sacrificial wear sensor that the wear sensor monitors to determine whether each circuit created by the series of conductive wires is open or closed.

11. The monitoring assembly of claim 1, wherein the spacer is made from a wear material being different from the material of the bolt.

12. A method of monitoring wear in a surface of a wear liner for a chute, the method comprising:

a. removing a bolt from a fastening location on the wear liner, b. inserting a bolt having a head and a spacer secured to the head into a bolt hole, c. securing the bolt and spacer combination to the wear liner with a coupling nut, d. inserting an elongate structure of a sensor probe into the bolt and spacer combination and through the coupling nut, ensuring a tip of the elongate structure is aligned with the wear liner surface that is subjugated to wear, e. securing the sensor probe to the coupling nut, and f. securing the spacer to a top of the bolt, wherein the spacer has a height that when combined with the bolt substantially aligns with the wear liner surface.

13. The method of claim 12, wherein the spacer is a plurality of spacers.

* * * * *